(12) United States Patent
Chotard et al.

(10) Patent No.: US 9,770,892 B2
(45) Date of Patent: Sep. 26, 2017

(54) INDUCTION WELDING PROCESS AND DEVICE FOR PARTS MADE OF COMPOSITE MATERIALS

(71) Applicant: Airbus Operation (S.A.S.), Toulouse (FR)

(72) Inventors: Florian Chotard, Nantes (FR); Cyrille Collart, Nantes (FR); Didier Trichet, I, Saint Nazaire (FR); Javad Fouladgar, Saint Nazaire (FR)

(73) Assignee: Airbus Operations (SAS), Toulouse (FR)

( * ) Notice: Subject to any disclaimer, the term of this patent is extended or adjusted under 35 U.S.C. 154(b) by 312 days.

(21) Appl. No.: 14/623,143

(22) Filed: Feb. 16, 2015

(65) Prior Publication Data
US 2015/0231869 A1 Aug. 20, 2015

(30) Foreign Application Priority Data
Feb. 18, 2014 (FR) .................................... 14 51293

(51) Int. Cl.
*B32B 37/06* (2006.01)

(52) U.S. Cl.
CPC .......... *B32B 37/06* (2013.01); *B32B 2310/00* (2013.01)

(58) Field of Classification Search
CPC .............................. B32B 37/06; B32B 2310/00
See application file for complete search history.

(56) References Cited

U.S. PATENT DOCUMENTS

| 3,709,775 A | 1/1973 | James |
| 5,001,319 A | 3/1991 | Holmstroem |
| 5,340,428 A | 8/1994 | Kodokian |
| 6,423,953 B1 * | 7/2002 | Johnson, Jr. ........ B29C 65/3616 219/634 |
| 2002/0113066 A1 * | 8/2002 | Stark ................... B29C 35/0272 219/634 |
| 2003/0062118 A1 * | 4/2003 | Gerhard ............. B29C 35/0272 156/274.4 |
| 2008/0216960 A1 * | 9/2008 | Schwiese ............ B29C 65/3656 156/380.2 |

(Continued)

FOREIGN PATENT DOCUMENTS

| DE | 202007003450 | 5/2007 |
| EP | 0387512 | 9/1990 |

(Continued)

OTHER PUBLICATIONS

French Search Report, Oct. 6, 2014.
French Search Report, Oct. 7, 2014.

*Primary Examiner* — Daniel McNally
(74) *Attorney, Agent, or Firm* — Greer, Burns & Crain, Ltd.

(57) ABSTRACT

A device comprising at least one pressure generation unit and a heating unit, the heating unit comprising a two-sided inductor and being configured to generate a uniform alternating magnetic field in an assembly comprising two parts made of composite materials comprising carbon fibers embedded in a resin and a field absorber. The field absorber is configured to absorb the magnetic field and comprising a ferromagnetic material. The field absorber is arranged at the contact walls of the two parts, so as to heat them to at least a transformation temperature of the resin.

11 Claims, 2 Drawing Sheets

(56) References Cited

U.S. PATENT DOCUMENTS

2015/0231805 A1    8/2015    Chotard

FOREIGN PATENT DOCUMENTS

| EP | 1326741 | 7/2003 |
| FR | 2221259 | 10/1974 |
| GB | 1161903 | 8/1969 |
| WO | 0185827 | 11/2001 |

* cited by examiner

INDUCTION WELDING PROCESS AND DEVICE FOR PARTS MADE OF COMPOSITE MATERIALS

CROSS-REFERENCES TO RELATED APPLICATIONS

This application claims the benefit of the French patent application No. 1451293 filed on Feb. 18, 2014, the entire disclosures of which are incorporated herein by way of reference.

BACKGROUND OF THE INVENTION

The present invention relates to a process and a device for induction welding parts made of composite materials. The invention relates in particular to the assembly of parts made of composite materials in the aeronautical field.

The parts made of composite materials generally comprise carbon fibers embedded in a resin which are deposited by drape forming, for example, so as to create folds superposed one on top of the other. In each fold the fibers are aligned in a main direction (0°, 45°, 90°). The planes of the carbon fiber folds are parallel to one another and define a plane referred to as the principal plane. Moreover, the methods involved in producing a part of this kind generate points of contact between the folds, the distribution of said points of contact being random and depending on the nature of the resin and the speed at which the carbon fibers are deposited.

The induction welding of parts made of thermoplastic composite materials involves using an inductor that emits a magnetic field and an interface element, usually made of conductive metal, disposed at the interface of the parts to be welded to focus the magnetic fields. The conductive metal is heated to what is referred to as a process temperature which at least corresponds to the transformation temperature of the composite materials, causing the structure of the composite parts to soften, in order to mix the two parts locally and thereby allow them to be welded together. The parts to be welded together must be made up of "compatible" composite materials, in other words composite materials that adhere to one another at the transformation temperature.

However, the main disadvantages of this type of process are firstly the highly localized presence of conductive metal in the final product and secondly, the difficulty in controlling the temperature of the process.

Certain induction welding devices cause the currents induced in the carbon of the surface folds of the composite materials to circulate. These devices generally tend to heat the contact walls, causing currents induced in the paramagnetic materials to circulate, such as the carbon of the carbon fibers of the composite materials, in other words with low sensitivity to the magnetic fields and with an electrical conductivity that allows the circulation of the Foucault currents to be transformed in terms of temperature by the Joule effect. This involves applying strong magnetic fields, in order to generate induced currents in these materials. Induced currents can likewise circulate in the folds which are not at the interface, as well as along points of contact between the folds.

In parts made of composite materials that are subject to the magnetic field of an induction welding device, the induced currents circulate in two directions:
- the main direction in the folds, along the carbon fibers of the parts, and
- a secondary direction perpendicular to the main direction between the folds, along which the points of contact are positioned between folds.

These welding processes through the circulation of induced currents are therefore difficult to control in terms of temperature and welding interface. In fact, it is difficult to manage the magnetic field in order to limit its effect exclusively to the surface carbon folds which are at the interface between the two composite materials to be welded.

Patent EP1326741B1 describes a polymer matrix composition comprising ferromagnetic elements dispersed in a polymer matrix and a process allowing heat to be generated by uniform hysteresis in the composition. With a matrix of this kind, the heating of the polymer matrix is uniform, localized and precisely controlled in terms of temperature.

Moreover, the induction welding of thermoplastic composites, in particular high-performance composites, is performed in the usual manner with the help of an inductor exhibiting a single-sided configuration.

Processes of this kind, with or without conductive metal, are prone to several limitations which prevent their use on an industrial scale in the aeronautical field.

In effect, the geometric design of the inductor is complex for simple planar surface geometries. It requires simulations that call for substantial computer resources, for example an L-shape requires two weeks of simulation in order to obtain the shape of the inductor, without guaranteeing the uniformity of the heat effect.

Moreover, there is a strong sensitivity to the distance between the inductor and the interface element which influences the heat balance at the interface. The magnetic fields emitted by the inductor are initially very strong in its immediate environment, decreasing exponentially as they move away from the inductor. This configuration involves geometric sensitivity, in other words, a tolerance in the distance between the inductor and the metal of less than one-tenth of a millimeter. In the case of a one-sided inductor, this distance has a great effect on the heat balance at the interface. If this distance varies, the temperature is too great or, conversely, is not great enough.

Hence, there is a close link between the geometry of the one-sided inductor and those of the parts to be welded. A different inductor has to be designed for each configuration with an adaptation of the welding parameters, such as the frequency, field strength or inductive system impedance.

SUMMARY OF THE INVENTION

A problem addressed by the present invention is that of eliminating all or some of the disadvantages of the prior art. It relates to an induction welding process for at least two parts made of composite materials comprising carbon fibers embedded in a resin and oriented in a main direction belonging to a principal plane, said process comprising the following stages or steps:
 a) formation of at least one field absorber configured to absorb a magnetic field and comprising a ferromagnetic material;
 b) formation of an assembly comprising the parts to be welded and the field absorber arranged at the contact walls of the parts; and
 c) generation over a predefined period of a uniform alternating magnetic field in the assembly with the help of a two-sided inductor, in a direction of incidence, so as to heat the contact walls of the assembly up to a temperature referred to as the process temperature.

According to the invention, the welding process is noteworthy in that it further comprises a tilting stage of at least one of the following elements: the assembly and the two-sided inductor, so as to orient the direction of incidence of the magnetic field in relation to the principal plane at an angle other than 90° and other than zero.

Hence, the process according to the invention provides for the application of a uniform (homogeneous) field by means of a two-sided rather than a single-sided inductor. The homogeneity of the field lines favors a uniform temperature over the assembly of the contact walls. Moreover, the process allows the preponderance of heating by hysteresis over heating by induced currents to be optimized by applying a magnetic field in a direction of incidence relative to the principal plane at an angle other than 90° and other than zero. This allows the assembly to be heated uniformly, in particular at the contact walls of the composite material.

The generation of this uniform magnetic field allows the geometry of the assembly to be welded to be dispensed with. Consequently, it is no longer necessary, thanks to the invention, to adapt the inductor to each surface or shape of the assembly to be welded. This process can therefore be used whatever the shape and profile of the parts to be welded.

The present invention may exhibit different embodiments that may be taken in combination or individually:
- the process comprises an application stage of a contact pressure on the assembly,
- the process comprises an additional stage, subsequent to stage c) and involving cooling the assembly and maintaining the contact pressure after generation of the magnetic field in the assembly has been stopped,
- the process temperature is defined between a transformation temperature of the resin and a temperature above this resin transformation temperature of at least 50° C.,
- at stage c), the assembly is moved relative to the two-sided inductor following a displacement speed, the generation time of the magnetic field in the assembly being controlled according to the displacement speed.

The present invention likewise relates to a composite element comprising at least two parts made of composite materials welded to one another using the aforementioned process.

The present invention further relates to an induction welding device for at least two parts made of composite materials comprising carbon fibers embedded in a resin and oriented in a main direction belonging to a principal plane, said device comprising at least one heating unit provided with at least one two-sided inductor comprising two walls spaced apart from one another and distributed on both sides of a support, on which is disposed, in normal use, an assembly comprising the parts to be welded and a field absorber, the field absorber being configured to absorb a magnetic field and comprising a ferromagnetic material, said field absorber being arranged at the contact walls of the two parts, so as to heat them to what is referred to as the process temperature, the device likewise comprising means of generation and means of adaptation of an alternating current intended for use in generating a uniform magnetic field between the two walls of the two-sided inductor.

According to the invention, this device further comprises means of tilting at least one of the following elements: the assembly and the two-sided inductor, so as to orient the direction of incidence of the magnetic field in relation to the principal plane at an angle other than 90° and other than zero.

Said field absorber may be realized in different ways. In particular, it may comprise:
- a ferromagnetic grate embedded in a film of composite material compatible with those of the parts to be welded and forming an interface element,
- ferromagnetic particles embedded in a film of composite material compatible with those of the parts to be welded and forming an interface element,
- ferromagnetic particles embedded in the contact wall of at least one of said parts.

In a preferred embodiment, each wall of the two-sided inductor comprises a Helmholtz coil.

BRIEF DESCRIPTION OF THE DRAWINGS

The attached figures clearly illustrate how the invention can be realized. In these figures, the same reference numbers are used to designate similar elements.

DETAILED DESCRIPTION OF THE PREFERRED EMBODIMENTS

Figure 1:
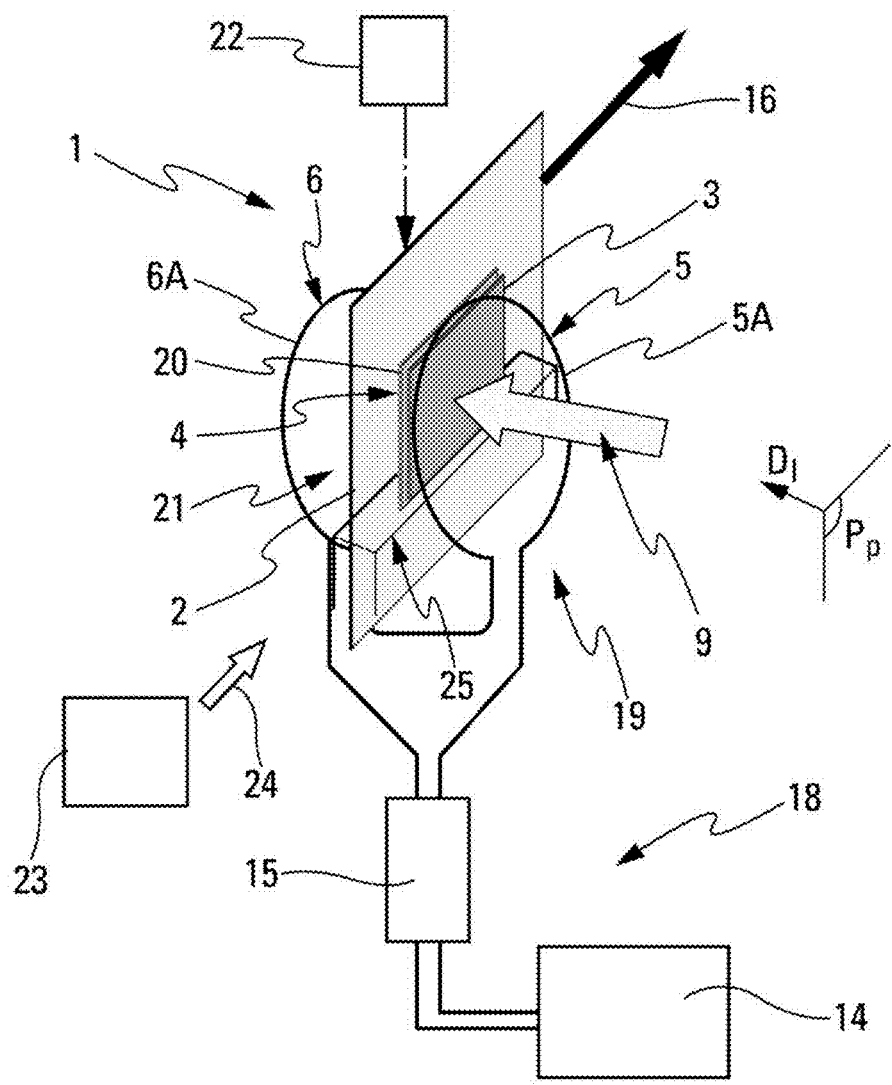
FIG. 1 is a schematic perspective view of a particular embodiment of a welding device illustrating the invention and FIG. 2 schematically shows a side view of the welding device in FIG. 1.
Figure 2:
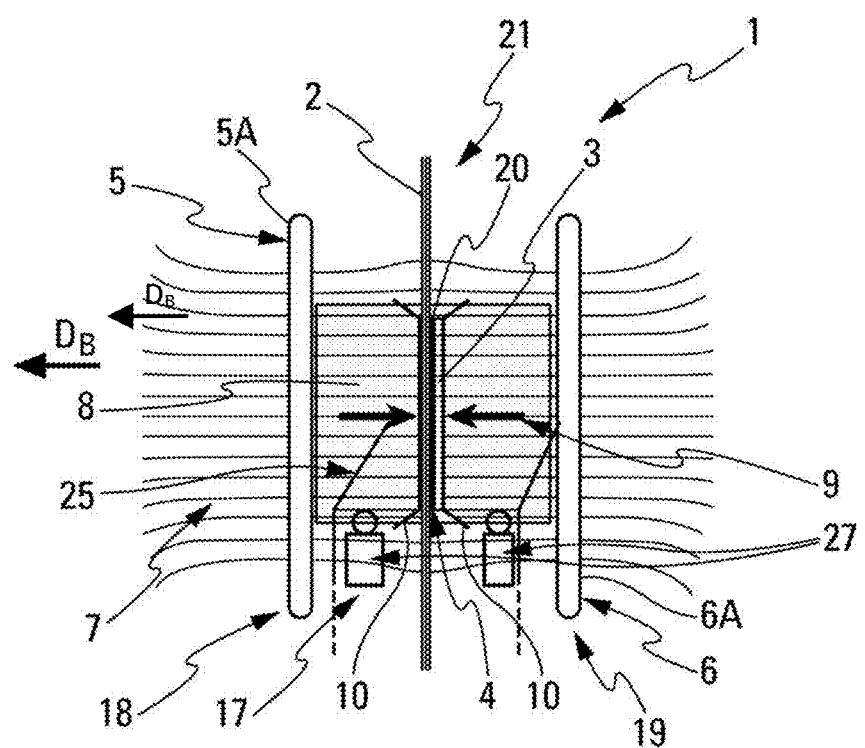

The welding device 1, represented in FIGS. 1 and 2, is intended for rapid welding of the parts 2, 3 made of compatible thermoplastic composite materials (with continuous fibers or long, short or unreinforced fibers), such as a skin and a clip foot, for example. The parts 2, 3 comprise carbon fibers aligned in a main direction DP and embedded in a resin, the fibers forming folds parallel to a plane referred to as the principal plane PP. This principal plane PP is perpendicular to a secondary direction Di, along which contact points may be positioned between folds during production of the parts 2, 3. To achieve this, the device 1 comprises, in particular, a support 25, a pressure generation unit 17 and a heating unit 18.

The heating unit 18 comprises a two-sided inductor 19 and is configured to generate a uniform alternating magnetic field 7 in an assembly 21 comprising the two parts 2 and 3 and a field absorber 4, as represented in FIG. 2, for a predefined period.

The invention is not, however, limited to the welding of two parts and could be applied to a plurality of parts to be assembled together, a field absorber then being disposed between each part.

As represented in FIG. 1, the heating unit 18 further comprises the two-sided inductor 19, an alternating-current generator 14 and means 15 of adaptation of this current. In the embodiments shown, the two-sided inductor 19 comprises two parallel walls 5, 6 spaced apart from one another and each forming a pair of Helmholtz coils which are linked by means 15 and which generate a uniform alternating magnetic field between the coils. Each Helmholtz coil comprises at least one circular loop 5A, 6A with a defined radius, the two coils being substantially identical. An electrical current circulating in the loop produces a magnetic field in a direction of incidence DB represented in FIG. 2 by field lines 7 perpendicular to the plane of the loops 5A, 6A. The two coils are arranged in parallel at a distance from one another that is substantially equal to their radius. Hence, a uniform magnetic field is obtained in a circular zone.

Alternatively, the Helmholtz coils may comprise a plurality of loops 5A, 6A that can be activated independently of one another, in order to adapt the power of the magnetic field to the types of composite materials to be welded.

As illustrated in FIG. 2, the welding device 1 further comprises means of tilting 27 the support 25 intended to orient the parts 2, 3. For example, the tilting means 27 comprise an assembly of at least three pneumatic cylinders situated beneath sides of the support 25. Hence, through a set of different movements from one cylinder to the other, the parts 2, 3 can be tilted on at least three axes, so that an angle between the direction of incidence DB of the magnetic field 7 and the principal plane PP of the carbon fiber folds is:
- other than 90°, in order to limit heating by circulation of induced currents along the main direction DP of the carbon fibers; and
- other than 0°, in order to limit heating by circulation of induced currents, at the contact points between the folds, along the secondary direction Di.

The tilting means 27 may likewise be applied to the two-sided inductor 19. In this embodiment (not shown), the two walls 5, 6 of the two-sided inductor 19 are oriented when the support 25 on which the assembly 21 is arranged remains fixed. In another variant which is not shown, the tilting means 27 may comprise first tilting elements applied to the two-sided inductor 19 and second tilting elements applied to the assembly 21.

In order to weld two parts 2 and 3 made of compatible contact materials, a field absorber 4 is therefore arranged at the interface of the two parts 2 and 3. The field absorber 4 is configured to absorb the magnetic field 7 emitted by the Helmholtz coils. The field absorber 4 is, for example, a polymer resin filled with ferromagnetic particles, as described in patent EP1326741B1, incorporated herein by reference. The field absorber 4 comprises a ferromagnetic material (in the form of a grate or in the form of ferromagnetic particles), the relative magnetic permeability whereof is higher than the magnetic permeability of the resin used and that of the carbon of the fibers (relative magnetic permeability $\mu<2$ T.m.A-1), for example of the powdered iron (relative magnetic permeability $\mu=250$ T.m.A-1 and Curie temperature=770°).

In a first embodiment, the grate or the ferromagnetic particles are embedded in a resin film compatible with those of the two parts 2 and 3 and form an interface element 20 disposed between the contact walls of the two parts 2 and 3, so that welding is carried out during the transformation of the composite materials.

According to another embodiment, the ferromagnetic particles are mixed with the composite material resin on the contact wall of at least one of the parts 2 and 3 at the time of production of the parts 2 and 3. The ferromagnetic material is present in the form of spherical ferromagnetic particles embedded in the resin, for example polysulfone (PSU), with volume fractions of between 10% and 20%. The diameter of the ferromagnetic particles is small (between 22 microns and 300 microns). The uniformity of the resin/particles mixture depends on the grade of the resin, the granulometry of the ferromagnetic material particles and also the impregnation between the resin and the carbon fibers (fiber/resin interface quality, resin viscosity, porosity rate). This other embodiment enables the two parts 2 and 3 to be put in direct contact, without having to provide for welding an interface element (such as the interface element 20) containing the ferromagnetic material between parts 2 and 3.

The two parts 2 and 3, as well as the field absorber 4 (integrated in one of the parts 2 and 3 or in an interface element 20), form an assembly 21 that is maintained by a contact pressure, represented by one or more arrows 9 in FIGS. 1 and 2, exerted by the pressure generation unit 17 by means of pressure application elements 10. The contact pressure is directed such that the parts 2 and 3 are pressed one against the other.

The assembly 21 placed in the space between the coils is subject to the effect of the magnetic field emitted by the coils, the grate made of ferromagnetic material or the ferromagnetic particles producing heat in particular. Hence, the field absorber 4 uniformly heats the interface between the two parts 2 and 3, thanks to the magnetic field uniformly distributed in the zone 8 where the assembly 21 is positioned.

In the case of heating by hysteresis, the uniformity of the thermal response in the surface is obtained thanks to the regularity of the surface distribution of the ferromagnetic material particles (in one of the parts 2 and 3 or in the interface element 20). The incidence of the surface in relation to the field and the form of the surface to be welded does not have an impact on the thermal distribution. This process is particularly constrained by the size of the ferromagnetic particles, their nature, the intensity of the magnetic field 7 and its frequency.

In order to guarantee temperature levels appropriate to the interface of the parts 2 and 3, a ferromagnetic material is used having a characteristic Curie temperature adapted to the resins used. Hence, the ferromagnetic material is chosen such that its Curie temperature is identical to a defined temperature referred to as the "process temperature", corresponding, for example, to the transformation temperature of the resin increased by a value of 0° to 50° according to the geometry of the parts to be welded. The Curie temperature corresponds to the temperature at which the ferromagnetic material becomes paramagnetic and, in particular, loses its thermal and electrical conduction properties. The transformation temperature depends on the nature of the resin and is, for example:
- either the surfusion temperature in the event that the resin of the parts 2, 3 is made of a semi-crystalline material;
- or the fusion temperature (or temperature at which "softening" begins) in the event that the resin of the parts 2, 3 is an amorphous material;
- or the polymerization temperature in the event that the resin of the parts 2, 3 is a thermosetting material.

For example, in the case of carbon fibers embedded in a polyether ether ketone resin (referred to as PEEK), the ferromagnetic material used may be NiFe5.

The Curie temperature is the temperature at which the ferromagnetic material becomes paramagnetic. This ferromagnetic material exhibits sensitivity to the magnetic field 7 that is far greater than the composite material to be welded. The conductivity, as well as the magnetic permeability of the ferromagnetic materials, evolves as a function of the temperature. At a fixed magnetic field frequency, the electrical permittivity of the materials likewise evolves as a function of the temperature and reaches a threshold beyond which it does not evolve any further.

Consequently, the application of a magnetic field 7 allows the temperature of the assembly 21 to be increased up to the Curie temperature, at which the ferromagnetic material loses its magnetization and its temperature stabilizes, which makes it possible for a constant heating temperature to be obtained. The temperature of the ferromagnetic material temperature subjected to a magnetic field follows a hysteresis cycle. These characteristics therefore allow a window to be defined about a characteristic temperature of the ferromagnetic material. By adapting the inductive parameters, such as the frequency of the alternating current and the power injected by the generator 14, associated with a uniform field configuration, uniform heating is generated at the interface at a controllable and reproducible temperature level.

Temperature variations on the contact walls are therefore avoided because the field applied is uniform and acts on the ferromagnetic material which has a specific Curie point corresponding to the transformation temperature of the composite materials.

The uniformity of the electromagnetic field is, moreover, guaranteed by the geometry of the inductor. In a Helmholtz coil, the field is uniform in the central zone (zone 8) over a diameter substantially equivalent to the radius of the loops 5A, 6A.

In the event that the two composite materials are different in nature, the higher of the two transformation temperatures is chosen, in order for the two materials to be transformed together.

The magnetic field 7 is maintained for a defined period, in order to obtain sufficient transformation of the contact walls. Once the magnetic field 7 has been stopped, the assembly 21 is kept in contact by contact pressure application elements 10 until it has cooled sufficiently.

Hence, the device 1 further comprises cooling means 23 (FIG. 1). In a preferred embodiment, the cooling means 23 comprise an assembly of circulation channels of a fluid, such as water or air, over the assembly 21, as illustrated by an arrow 24 in FIG. 1. Cooling is achieved when the temperature of the assembly 21 is lowered again below the crystallization temperature of the composite materials. In this case, the welding between the two parts 2 and 3 made of composite materials is carried out and the contact pressure, which has become useless, is stopped.

In a first embodiment of the invention, the assembly 21 is kept immobile during welding in the two-sided inductor 19.

Moreover, in a second embodiment of the invention, the device 1 further comprises means of displacement 22 which are capable of moving the assembly 21 between the coils, as indicated by an arrow 16 in FIG. 3. The assembly 21 is subjected to translational movement in zone 8 where the magnetic field 7 is uniform. The displacement speed of the assembly 21 (generated by the means of displacement 22) is controlled such that the exposure time to the magnetic field 7 (between the coils) is sufficient to reach the transformation temperature of the composite materials and thereby achieve welding of the parts 2 and 3.

In this second embodiment, a production line allows the assembled parts 2 and 3 to be produced by making them circulate in an assembly between the two coils.

The magnetic field 7 is applied with defined parameters depending on the nature of the ferromagnetic material, the granulometry of the particles or of the grate. In a preferred embodiment, the frequencies are raised (in the order of MHz), as well as the powers (the magnetic field 7 is greater than 5000 A/m). High frequencies (from 1 MHz to 10 MHz) ensure the heating of multiple magnetic domains in the particles which are favorable to the hysteresis effect. Moreover, an increased magnetic field, greater than 5000 A/m, allows the heating to be better controlled thanks to the Curie temperature. In addition, these inductive parameters initiate heating by hysteresis and limit heating by induced current circulation.

It will be noted that the device according to the invention allows complex geometries to be welded in simple form or exhibiting a double curve, or else comprising variations in thickness.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An induction welding process for at least two parts made of composite materials comprising carbon fibers embedded in a resin and oriented in a main direction belonging to a principal plane, said process comprising the following steps:
   forming at least one field absorber configured to absorb a magnetic field and comprising a ferromagnetic material;
   forming an assembly comprising the parts to be welded and the at least one field absorber arranged at contact walls of the parts;
   generating, over a predefined period, a uniform alternating magnetic field in the assembly with a two-sided inductor having two walls, in a direction of incidence, so as to heat the contact walls of the assembly up to a temperature referred to as the process temperature; and
   tilting at least one of the following elements: the assembly and the two-sided inductor, so as to orient the direction of incidence of the magnetic field in relation to the principal plane at an angle other than 90° and other than zero while the walls of the two-sided inductor are parallel.

2. The process according to claim 1, further comprising a step of applying a contact pressure on the assembly.

3. The process according to claim 2, further comprising:
   stopping the generation of the magnetic field; and,
   cooling the assembly and maintaining the contact pressure, after the generation of the magnetic field in the assembly has been stopped.

4. The process according to claim 1, wherein the process temperature is defined between a transformation temperature of the resin and a temperature above this resin transformation temperature of at least 50° C.

5. The process according to claim 1, wherein during the generating step, the assembly is moved relative to the two-sided inductor following a displacement speed, the generation time of the magnetic field in the assembly being controlled according to the displacement speed.

6. The process of claim 1 wherein the walls each include at least one coil, and wherein a distance between the two walls is substantially equal to a radius of one of the coils.

7. An induction welding process for at least two parts made of composite materials comprising carbon fibers embedded in a resin and oriented in a main direction belonging to a principal plane, said process comprising:
   forming at least one field absorber configured to absorb a magnetic field and comprising a ferromagnetic material;
   forming an assembly comprising the parts to be welded and the at least one field absorber arranged at contact walls of the parts;

generating, over a predefined period, an alternating magnetic field in the assembly with two-sided inductor having two walls, in a direction of incidence, so as to heat the contact walls of the assembly up to a temperature referred to as the process temperature; and tilting at least one of the assembly and the two-sided inductor, so as to orient the direction of incidence of the magnetic field in relation to the principal plane at an angle other than 90° and other than zero while the walls of the two-sided inductor are parallel;

stopping the generation of the magnetic field; and, cooling the assembly, after the generation of the magnetic field in the assembly has been stopped.

8. The process according to claim 7, wherein the process temperature is defined between a transformation temperature of the resin and a temperature above this resin transformation temperature of at least 50° C.

9. The process according to claim 7, wherein the generation of the alternating magnetic field step, the assembly is moved relative to the two-sided inductor following a displacement speed, the generation time of the magnetic field in the assembly being controlled according to the displacement speed.

10. The process of claim 7, wherein the magnetic field is uniform.

11. The process of claim 7 wherein the walls each include at least one coil, and wherein a distance between the two walls is substantially equal to a radius of one of the coils.

* * * * *